US012793232B2

(12) United States Patent
Yeh et al.

(10) Patent No.: US 12,793,232 B2
(45) Date of Patent: Nov. 10, 2026

(54) SYSTEMS AND METHODS FOR IDENTIFYING AND TRACKING AN INTERACTIVE OBJECT FROM A PLURALITY OF INTERACTIVE OBJECTS

(71) Applicant: Universal City Studios LLC, Universal City, CA (US)

(72) Inventors: Wei Cheng Yeh, Orlando, FL (US); Rachel Elise Rodgers, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 344 days.

(21) Appl. No.: 18/485,989

(22) Filed: Oct. 12, 2023

(65) Prior Publication Data

US 2024/0135548 A1 Apr. 25, 2024
US 2024/0233138 A9 Jul. 11, 2024

Related U.S. Application Data

(60) Provisional application No. 63/417,348, filed on Oct. 19, 2022.

(51) Int. Cl.
*G06T 7/20* (2017.01)
*G06T 7/70* (2017.01)
(Continued)

(52) U.S. Cl.
CPC .................. *G06T 7/20* (2013.01); *G06T 7/70* (2017.01); *G06V 10/141* (2022.01); *G06V 10/60* (2022.01); *G06V 2201/07* (2022.01)

(58) Field of Classification Search
CPC ......... G06T 7/20; G06T 7/70; G06V 2201/07; A63F 13/213; A63F 13/215;
(Continued)

(56) References Cited

U.S. PATENT DOCUMENTS 9,692,756 B2 6/2017 Poisner et al.
10,307,683 B2 6/2019 Weston
(Continued)

FOREIGN PATENT DOCUMENTS

CN 208865191 U 5/2019

OTHER PUBLICATIONS

PCT/US2023/035421 International Search Report and Written Opinion mailed Jan. 26, 2024.

*Primary Examiner* — Andrew M Moyer
*Assistant Examiner* — Conor A O'Malley
(74) *Attorney, Agent, or Firm* — Fletcher Yoder, P.C.

(57) ABSTRACT

An interactive object control system includes one or more processors and memory storing instructions, that when executed by the one or more processors cause the one or more processors to determine a respective signal strength of respective signals received at communication circuitry from respective interactive objects of multiple of interactive objects in an interactive environment. The instructions, when executed by the one or more processors, cause the one or more processors to select a best candidate interactive object from the multiple of interactive objects based on the respective signal strength of the respective signals and send instructions to the best candidate interactive object to activate one or more object emitters of the best candidate interactive object.

17 Claims, 4 Drawing Sheets

(51) Int. Cl.
*G06V 10/141* (2022.01)
*G06V 10/60* (2022.01)

(58) Field of Classification Search
CPC ........ A63F 13/245; A63F 13/26; A63F 13/28; A63F 13/327; A63F 13/92; H04W 8/18
See application file for complete search history.

(56) References Cited

U.S. PATENT DOCUMENTS

| | | | | |
|---|---|---|---|---|
| 10,488,919 | B2 * | 11/2019 | George-Svahn ....... | B60K 35/10 |
| 10,583,357 | B2 | 3/2020 | Barney et al. | |
| 11,052,309 | B2 | 7/2021 | Barney et al. | |
| 2014/0228124 | A1 | 8/2014 | Plagge et al. | |
| 2016/0310538 | A1 | 10/2016 | Attawia et al. | |
| 2017/0150533 | A1 | 5/2017 | Alipour et al. | |
| 2017/0245309 | A1 | 8/2017 | Park et al. | |
| 2018/0357454 | A1 | 12/2018 | Felch | |
| 2019/0220635 | A1 * | 7/2019 | Yeh .................... | G06K 7/10366 |
| 2020/0001176 | A1 * | 1/2020 | Barney ................... | A63F 13/65 |
| 2022/0214742 | A1 | 7/2022 | Yeh et al. | |

* cited by examiner

SYSTEMS AND METHODS FOR IDENTIFYING AND TRACKING AN INTERACTIVE OBJECT FROM A PLURALITY OF INTERACTIVE OBJECTS

CROSS-REFERENCE TO RELATED APPLICATION

This application claims priority to and the benefit of U.S. Provisional Application No. 63/417,348, entitled "SYSTEMS AND METHODS FOR TRACKING AN INTERACTIVE OBJECT" and filed Oct. 19, 2022, which is incorporated by reference herein in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

To improve guest experiences in an entertainment setting, the entertainment setting may often include objects (e.g., props or toys) that are interactive, provide special effects, or both. For example, the special effects may provide customized effects based on guests' experiences within the entertainment setting, as well as support a particular narrative in the entertainment setting. In certain interactive entertainment settings, guests may own or be associated with objects that interact with the interactive entertainment setting in various ways. In one example, a guest may wish to interact with the interactive entertainment setting using a handheld device (e.g., an object) to generate a particular special effect. However, such interactive entertainment settings are often crowded with multiple guests. Moreover, communicating wireless signals to identify objects within such interactive entertainment settings may be challenging when multiple guests are each carrying their own object.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below In accordance with an embodiment, an interactive object control system includes one or more processors and memory storing instructions, that when executed by the one or more processors cause the one or more processors to determine a respective signal strength of respective signals received at communication circuitry from respective interactive objects of multiple of interactive objects in an interactive environment. The instructions, when executed by the one or more processors, cause the one or more processors to select a best candidate interactive object from the multiple of interactive objects based on the respective signal strength of the respective signals and send instructions to the best candidate interactive object to activate one or more object emitters of the best candidate interactive object. The instructions, when executed by the one or more processors, cause the one or more processors to, in response to detection of an emission from the one or more object emitters of the best candidate interactive object, tag the best candidate interactive object as a target interactive object. The instructions, when executed by the one or more processors, cause the one or more processors to track motion of the target interactive object and provide output instructions to the one or more object emitters, to one or more special effect components in the interactive environment, or both to generate special effect outputs based on the motion of the target interactive object.

In accordance with an embodiment, a method of operating an interactive object control system includes receiving, at one or more processors, data indicative of respective positions of multiple of interactive objects relative to one or more sensors. The method also includes selecting, using the one or more processors, a best candidate interactive object from the multiple interactive objects based on the respective positions of the multiple interactive objects relative to the one or more sensors. The method further includes sending, using the one or more processors, instructions to the best candidate interactive object to activate one or more object emitters of the best candidate interactive object. The method further includes tagging, using the one or more processors, the best candidate interactive object as a target interactive object in response to receipt of additional data that indicates detection of an emission from the one or more object emitters of the best candidate interactive object. The method further includes tracking, using the one or more processors, motion of the target interactive, as well as providing, using the one or more processors, output instructions to the one or more object emitters, to one or more special effect components in an interactive environment, or both to generate special effect outputs based on the motion of the target interactive object.

In accordance with an embodiment, an interactive object control system includes a first interactive object of multiple interactive objects, the first interactive object including a first light emitter and a first radiofrequency identification tag circuitry. The interactive object control system also includes a second interactive object of the multiple interactive objects, the second interactive object including a second light emitter and a second radiofrequency identification tag circuitry. The interactive object control system further includes a controller having one or more processors and memory storing instructions, that when executed by the one or more processors, cause the one or more processors to receive, from one or more sensors, gesture signals indicative of performance of a gesture with one of the multiple interactive objects. The instructions, when executed by the one or more processors, cause the one or more processors to, in response to receipt of the gesture signals, detect presence of the first interactive object in an interactive area based on receipt of a first signal from the first radiofrequency identification tag circuitry; detect presence of the second interactive object in the interactive area based on receipt of a second signal from the second radiofrequency identification tag circuitry; determine a first signal strength of the first signal; determine a second signal strength of the second signal; and designate the first interactive object as a best candidate interactive object in response to the first signal strength being greater than the second signal strength.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
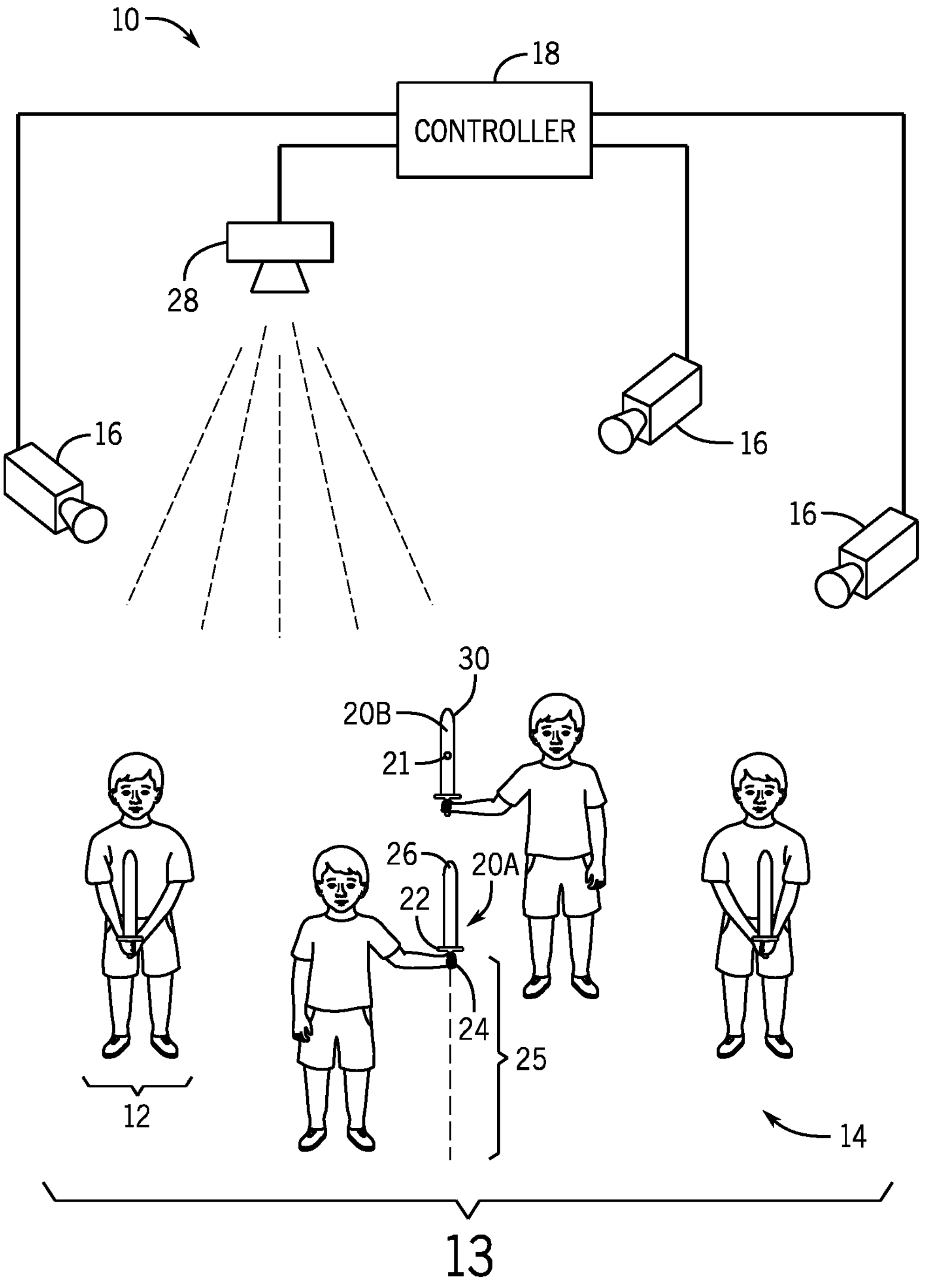
FIG. 1 is a schematic illustration of an embodiment of an interactive object control system, in accordance with present techniques.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Users (e.g., guests) in an interactive environment (e.g., an immersive experience or an entertainment setting) may enjoy carrying or wearing objects (e.g., props; guest objects; interactive objects), such as carrying handheld objects or wearing costume elements. The objects may be associated with a theme and may include a sword, wand, token, medallion, headgear, figurine, stuffed animal, clothing (e.g., hat), jewelry (e.g., necklace, bracelet, band), other portable object, or any combination thereof. Such objects may be utilized to facilitate interactions with the interactive environment. For example, certain movements of a toy sword may be detected as input that can initiate a special effect (e.g., display of imagery, such as animated characters; lighting; sounds; and/or haptic effects). Such interactions in the interactive environment may generally be detected and controlled based on a sensor (or sensors) and/or control circuitry that recognizes the object inside the interactive environment (e.g., via object recognition or wireless communication). The sensor and/or control circuitry may control the object and/or operation of surrounding features based on recognition of the object, based on recognition of a pattern associated with the object (e.g., movement or operation of the object), or the like. In some embodiments, the sensor and/or control circuitry may be positioned external to the interactive environment, but control features within the interactive environment. While feedback (e.g., special effects) related to the object may often be provided via components that are separate from the object within the interactive environment, present embodiments may also operate to provide feedback (e.g., special effects) from within or on the object, which may facilitate a deeper level of user immersion into the interactive environment.

As noted herein, the present embodiments relate to the objects that may include any suitable type of interactive objects in any suitable form, including the form of a sword, wand, token, medallion, headgear, figurine, stuffed animal, clothing (e.g., hat), jewelry (e.g., necklace, bracelet, band), and so forth. Additionally, the objects may include on-board communication circuitry that, in operation, communicates object identification information and/or receives and sends wireless signals. Further, the objects may include one or more on-board emitters or any other suitable hardware or circuitry components to enable feedback (e.g., display of special effects) and interaction with the interactive environment.

Without the disclosed embodiments, individually addressing one user and/or one object within a crowded interactive environment with many users and many objects may be challenging. Additionally, without the disclosed embodiments, precisely locating one object and tracking the one object within a crowded interactive environment may be challenging. It may be desirable to identify the one object within the interactive environment that corresponds to a user profile, and also to track the movement of the one object within the interactive environment. Indeed, such identifying and tracking may facilitate unique interactions directly with the one object, such as in response to detected operations of the one object. For example, when a particular object within a group of similar objects is detected as performing a particular gesture, present embodiments may cause special effects to emit from the particular object or from an environmental component associated therewith (e.g., a special effect near the particular object or being pointed at by the particular object). Similarly, mere detection of individual objects within the interactive environment may enable present embodiments to direct respective interactions (e.g., special effects) to each of the objects individually. Such detection of individual objects may be based on object recognition, object motion within the interactive environment, and/or other identifying aspects. Further, such directed respective interactions may be based on profiles (e.g., profiles including preferred special effect types) identified as associated with the individual objects.

The disclosed interactive object techniques permit user identification of a user and/or object identification of an object, as well as facilitate arbitrating between multiple components (e.g., special effect systems, control systems) of an interactive environment. In an embodiment, an interactive object control system may identify or locate a particular object within a group of similar objects present in the interactive environment. Then, the interactive object control system may activate or direct special effects to the identified particular object and/or based on the identified particular object, for example, without necessarily activating or directing special effects to other objects in the group and/or based on the other objects in the group. Communicating object identification information from the particular object may facilitate identification of the particular object itself. However, to track the particular object within the interactive environment, the present techniques may permit dynamic identification of the particular object in a manner that is specific to a particular user interacting with the particular object at a particular time.

In certain interactive environments, multiple objects may be present. Distinctions between the multiple objects may be limited. Identification and tracking methods may be utilized to facilitate directing special effects to individual objects based on interactive object movement within the interactive environment. To accomplish this, the interactive object control system within the interactive environment may include a controller that may detect one or more objects using image data (e.g., infrared [IR] camera images) and that may also receive object identification information (e.g., identification numbers) via signals (e.g., data) communicated over a particular radio frequency (e.g., range). The controller may identify a best candidate object among the multiple objects based on a received signal strength of the signals that provide the object identification information, a user profile associated with the object identification information, and/or any other suitable selection criteria. The controller may send special effect instructions or other operational instructions to a single object that was identified as the best candidate object. The special effect instructions or other operational instructions may include instructions to activate one or more on-board emitters, such as light emitting diodes (LEDs) of the object that emit light (e.g., in a visible spectrum or detectable IR spectrum). The interactive object control system may include cameras that provide the image data and also detect a lit object (e.g., the object with the illuminated one or more LEDs) of the multiple objects. In this way, the interactive object control system may effectively tag the lit object as a target object of interest, and confirm a position of the target object of interest and continue to track motion of the target object of interest via one or more sensors. For example, the one or more sensors may track the motion of the target object of interest over time, and then send object movement data to the controller, so that special effects commands are directed based on the motion of the target object of interest over time. The one or more sensors may track the motion via communication with communication circuitry, via image analysis of images that include reflected light from a detectable marker of the target object of interest, via image analysis of images that include emitted light from the target object of interest, and/or via any other suitable technique.

An object in accordance with present embodiments may be an interactive object (e.g., a toy) that can be used within the interactive environment to permit greater variability in experiences by enabling individualized output from user interactives. User interactives may include equipment (e.g., displays, lighting, speakers, and/or haptic devices) that provides special effects or other types of output, including special effects or other types of output that can be directed to a specific user based on associating a detected object with a user profile or the like. Specifically, user interactives operate to detect object identification information associated with a particular object, associate the object identification information with a user profile (e.g., via communication with the controller), and provide an output based thereon (e.g., via communication with an effect system within the interactive environment). Linking a user profile to a user interactive may facilitate selecting special effects that are based upon information or data associated with the user profile.

The interactive environment may be part of an amusement park, an entertainment complex, a retail establishment, and so forth. The disclosed systems and methods may include at least one or more interactive environments in a themed area having a common theme. Further, the disclosed systems and methods may include additional or other interactive environments having different themes, but that are within the same theme park or entertainment venue. In some embodiments, the interactive environment may be a live show, where the users are in the audience and may be able to participate in the live show using their objects. When referring to an interactive environment, the interactive environment may include a certain area of the theme park where users can interact with interactive elements within the certain area. Further, an interactive environment may also include different locations that are geographically separated from one another or that are dispersed throughout the theme park. The interactive environment may also be in a remote location. For example, the user may be able to establish an interactive environment at their home or any other location via an electronic device associated with the user (e.g., user electronic device; home console) that may interact with the object.

FIG. 1 is a schematic illustration of an embodiment of an interactive object control system 10, in accordance with present techniques. In one embodiment, the interactive object control system 10 may receive or detect interactive object identification information, which may include a unique device identification number, light (e.g., infrared (IR) light), and the like, from one or more interactive objects 20 in an interactive environment 14. The interactive environment 14 may include an area within a range for communication with one or more emitters 28 and one or more sensors 16 of the interactive object control system 10. In one embodiment, the object identification information may be based on a detectable marker 21 on a housing 22 of the interactive object 20. The detectable marker 21 may include reflective materials, retroreflective materials, and the like. That is, the detectable marker 21 may be detected by the interactive object control system 10 based on reflectivity, for example, such that the one or more interactive objects 20 provide the object identification information passively. In one embodiment, the object identification information may be based on a unique identification code stored within via a radio frequency identification (RFID) tag on or in the housing 22 of the one or more interactive objects 20, and the unique identification code may be transmitted to the interactive object control system 10 (e.g., read by a RFID reader of the interactive object control system 10).

As illustrated, users 12 may interact with the interactive object control system 10. The interactive object control system 10 includes the one or more emitters 28 (which may be all or a part of an emission subsystem having one or more emission devices and associated control circuitry) that emit one or more wavelengths of electromagnetic radiation (e.g., light, such as IR light, ultraviolet light, visible light; radio waves; and so forth). In one embodiment, the one or more emitters 28 may emit light within any suitable IR range that corresponds to a retroreflector range of the detectable markers 21 of the interactive objects 20 (e.g., 800 nanometer [nm]-1100 nm). The one or more emitters 28 may be multi-frequency light emitters and may emit light over different and/or multiple IR ranges (e.g., 800 nm-850 nm, 900 nm-1100 nm), which may facilitate detection of multiple interactive objects 20.

The interactive object control system 10 may also include one or more sensors 16, such as cameras, that may capture reflected light from the detectable markers 21 of the one or more interactive objects 20. The one or more sensors 16 may detect light (e.g., limited to light within the 800 nm-1100 nm range; any suitable range, such as any suitable IR range). As noted, the one or more interactive objects 20 may include the detectable markers 21, which may be retroreflectors that filter light over different bands (e.g., of the IR spectrum), such that only certain frequencies may be reflected back in a detectable form based on the range. For example, a first interactive object 20A may communicate light filtered over an IR range of 800-850 nm and a second interactive object 20B (e.g., an additional interactive object) may communicate light filtered over an IR range of 900-1100 nm. The one or more sensors 16 may capture the reflected light from the one or more interactive objects 20 and communicate data indicative of the reflected light to the interactive object control system 10. Then, the interactive object control system 10 may subsequently sort the received reflections (e.g., from lower to higher IR ranges), to aid in identification of the one or more interactive objects 20.

A first set or type of the one or more interactive objects 20 (e.g., certain models or versions, which may have a first set of features, such as absence of light emitters and/or haptic devices) may include respective detectable markers 21 that have a first retroreflector range (e.g., 800 nm-850 nm), while a second set of type of the one or more interactive objects 20 (e.g., other models or versions, which may have a second set of features, such as light emitters and/or haptic devices) may include respective detectable markers 21 that have a second retroreflective range (e.g., 900 nm-1100 nm), and so forth. Indeed, in some embodiments, the one or more interactive objects 20 may include multiple interactive objects (e.g., some of the first set or type, and some of the second set or type). The different ranges may assist in identifying the one or more interactive objects 20, identifying features of the one or more interactive objects 20, and/or distinguishing the multiple interactive objects from one another. The interactive object control system 10 may use this information to carry out appropriate further interactive steps based on the features of the one or more interactive objects 20 (e.g., the multiple interactive objects in a group). For example, as discussed in more detail herein, the interactive object control system 10 may proceed to instruct illumination of light emitters on a best candidate interactive object that is expected to be of the first set or type of the one or more interactive objects 20 that includes the light emitters, but may not do so if the best candidate interactive object is expected to be of the second set or type of the one or more interactive objects 20 that is devoid of the light emitters (instead, the interactive object control system 10 may proceed to track the best candidate interactive object, such as via reflected light from the detectable marker 21, without further steps to confirm or to tag the best candidate interactive object).

Additionally, the one or more sensors 16 (which may be all or a part of a detection subsystem having one or more sensors, cameras, or the like, and associated control circuitry) may detect one or more of signals transmitted (e.g., reflected; via radio waves) from the one or more interactive objects 20. To control operations of the one or more emitters 28 and the one or more sensors 16 (emission subsystem and sensor subsystem), as well as to perform various signal processing routines resulting from the emission and detection processes, the interactive object control system 10 may also include a controller 18. The controller 18 may be directly or communicatively coupled to the one or more emitters 28 and/or the one or more sensors 16. As illustrated, the interactive object control system 10 may include the one or more interactive objects 20 (illustrated as handheld objects) that each include the housing 22 having an exterior surface 24, which may support the detectable marker 21. In an embodiment, an interior of the housing 22 may include communication circuitry 26 (e.g., the RFID tag).

As discussed here, the communication circuitry 26 may actively or passively communicate certain object identification information of respective the respective interactive object of the one or more interactive objects 20 to the one or more sensors 16 in the interactive environment 14. In an embodiment, the communication circuitry 26 may include a RFID tag. In this way, the communication circuitry 26 may communicate the object identification information of the respective interactive object of the one or more interactive objects 20 to the one or more sensors 16 (implemented as receivers or RFID readers or any other suitable communication circuitry) of the interactive environment 14, which may subsequently communicate the object identification information to the controller 18 of the interactive object control system 10. Generally, the communication circuitry 26 may enable wireless communication of the object identification information between respective hardware of the respective interactive object of the one or more interactive objects 20 and respective hardware of the interactive object control system 10 so that the object identification information that relates to one or both of a user profile and an object profile may be dynamically updated and used to generate personalized commands sent to the respective interactive object of the one or more interactive objects 20 and/or the interactive environment 14 from the controller 18.

In an embodiment, the one or more emitters 28 are external to (e.g., spaced apart from) the one or more interactive objects 20. The one or more emitters 28 may emit electromagnetic radiation (indicated as an expanding electromagnetic radiation beam for illustrative purposes) to selectively provide the electromagnetic radiation in the interactive environment 14. The electromagnetic radiation, in certain embodiments, may represent multiple electromagnetic beams (beams of electromagnetic radiation, or light) emitted from one or more sources of the one or more emitters 28 (e.g., different sources; all part of an emission subsystem that includes the one or more emitters 28). For example, the different sources may include a visible light source, an infrared light source, and so forth, to emit respective electromagnetic radiation over respective desired wavelengths. Further, the one or more emitters 28 may include one or more sources for providing the electromagnetic radiation, such as light emitting diodes, laser diodes, and the like. The electromagnetic radiation may generally represent any form of electromagnetic radiation that may be used in accordance with present embodiments, such as forms of light (e.g., infrared, visible, ultraviolet [UV]) and/or other bands of the electromagnetic spectrum (e.g., radio waves and so forth). However, it is also presently recognized that certain bands of the electromagnetic spectrum may be used depending on various factors. For example, in one embodiment, the one or more emitters 28 may provide electromagnetic radiation that is not visible to the human eye and/or not within an audible range of human hearing, so that the electromagnetic radiation used does not distract users from their experience. Further, it is also presently recognized that certain forms of electromagnetic radiation, such as certain wavelengths of light (e.g., IR) may be more desirable than others, depending on the particular setting (e.g., whether the setting is "dark" or whether people are expected to cross the path of the beam). The detectable marker 21 may be a retroreflector, such as to reflect light in a particular range (e.g., 800-1100 nm range, or a subset thereof) that is emitted from the one or more emitters 28. As discussed herein, the reflected light may be detected by the one or more sensors 16, which may facilitate generating data indicative of a presence or motion of the one or more interactive objects 20.

In an embodiment, a combination of the one or more emitters 28 and the one or more sensors 16 (implemented as receivers, such as the IR cameras) of the interactive environment 14 may be used to match particular interactive objects of the one or more interactive objects 20 to user profiles, as well as to track motion of the particular interactive objects of the one or more interactive objects 20 within the interactive environment 14. This may enable special effects to be directed to a tracked particular interactive object of the one or more interactive objects 20 and/or displayed within the interactive environment 14 based on the particular user profile associated with the tracked particular interactive object of the one or more interactive objects 20 and/or the motion of the tracked particular interactive object of the one or more interactive objects 20. For example, IR projectors (e.g., the one or more emitters 28) may emit IR light, which is in turn reflected from at least one of the one or more interactive objects 20 within the interactive environment 14 and then detected by at least a portion of the one or more sensors 16. In an embodiment, types of detected light may be used alone or in combination to facilitate not only identification of location of the one or more interactive objects 20, but also identification of an associated user profile (e.g., a certain light filter of a retroreflector may be associated with a particular user profile). However, additional detectable characteristics of the one or more interactive objects 20 and/or the users 12 may be employed in addition or separately to achieve similar purposes. For example, at least a portion of the one or more sensors 16 may receive identification information (e.g., identification numbers) and/or triangulated positional information based on RFID tags of the one or more interactive objects 20 within the interactive environment 14, wherein the RFID tags may be stimulated to provide the identification information upon receipt of radio signals emitted via the one or more emitters 28.

In order to correlate certain activities with outputs (e.g., special effects), present embodiments may associate particular activities with particular interactive objects of the one or more interactive objects 20 based on certain detectable criteria. For example, in attempting to identify a particular interactive object of the one or more interactive objects 20 that performed a particular gesture, the controller 18 may receive the object identification information detected for the one or more interactive objects 20 (whether based on light detection, RFID detection, or both), and may retrieve one or more user profiles that correspond to the identification information (e.g., identification numbers) of the one or more interactive objects 20. The controller 18 may also receive positional information for the one or more interactive objects 20 based on light detection, RFID detection, or the like. The positional information, for example, may include a signal strength, which may be indicative of a distance of a particular interactive object of the one or more interactive objects 20 from a respective sensor 16 that detected the signal. In another example, the positional information may be a size of an image (e.g., corresponding to a retroreflector detected by a camera of the one or more sensors 16), which may be indicative of a distance between a particular interactive object of the one or more interactive objects 20 from the respective camera that captured the image (e.g., based on standard object sizes and/or standard sizes of retroreflectors)
.

In an embodiment, the object identification information and/or the positional information may then be used to select a best candidate interactive object of the one or more interactive objects 20. The best candidate interactive object may include the particular interactive object of the one or more interactive objects 20 that is likely to have performed a gesture. In an embodiment, the best candidate interactive object of the one or more interactive objects 20 may be selected based on the respective received signal strength of the respective signals from the one or more interactive objects 20 (e.g., the best candidate interactive object of the one or more interactive objects 20 has a strongest signal strength), user profile (e.g., the best candidate interactive object of the one or more interactive objects 20 is associated with a user of a particular age and/or a particular height), or any other selection criteria, or any combination thereof (e.g., the best candidate interactive object of the one or more interactive objects 20 has the strongest signal strength among all child users in a particular age range). That is, the best candidate interactive object of the one or more interactive objects 20 may be based on one or more factors, changes to the factors, changes to thresholds associated with the factors (e.g., signal strength above a threshold level), and the like.

In any case, once the best candidate interactive object of the one or more interactive objects 20 is identified, the controller 18 may send a signal addressed to the best candidate interactive object of the one or more interactive objects 20 to activate one or more object emitters 30 of the best candidate interactive object of the one or more interactive objects 20 (e.g., on-board LEDs or speakers of the one or more interactive objects 20) to emit light, sound, or some other detectable emission. Such an emission from the best candidate interactive object of the one or more interactive objects 20 can then be detected to confirm location and identity thereof. As a specific example, the controller 18 may emit a signal addressed to the best candidate interactive object of the one or more interactive objects 20 (e.g., by controlling the signal to activate an associated RFID tag of the best candidate interactive object). The best candidate interactive object of the one or more interactive objects 20 (e.g., the RFID tag of the best candidate interactive object of the one or more interactive objects 20) may receive the signal and automatically activate the one or more object emitters 30 of the best candidate interactive object of the one or more interactive objects 20 to display light (e.g., light in the visible spectrum), sound, or any suitable emission effect that may be used for identification and/or tracking. In an embodiment, an RFID tag of the best candidate interactive object of the one or more interactive objects 20 may send a signal to other communication circuitry thereof that may subsequently send a signal to activate the one or more object emitters 30 of the best candidate interactive object of the one or more interactive objects 20. The interactive object control system 10 may then confirm the presence of, confirm the position of, and/or otherwise identify the best candidate interactive object of the one or more interactive objects 20 because it will be the only interactive object of the one or more interactive objects 20 providing the emission (e.g., the only interactive object of the one or more interactive objects 20 with illuminated LEDs). It should be appreciated that the best candidate interactive object of the one or more interactive objects 20 may be triggered to provide only temporary or short emissions of a suitable duration (e.g., milliseconds, less than one second) to enable detection of the emissions by the one or more sensors 16, although the best candidate interactive object of the one or more interactive objects 20 may be triggered to provide longer continuous and/or repeated emissions (e.g., continuous or periodic while within the range of the one or more emitters 28 and the one or more sensors 16 or for some other period of time) to facilitate detection of the emissions over time.

The controller 18 may use cameras of the one or more sensors 16 to detect the best candidate interactive object of the one or more interactive objects 20 when it is providing a detectable emission (e.g., light in the visible spectrum), and may tag it (e.g., apply a tag to it). At this point, the best candidate interactive object of the one or more interactive objects 20 may be considered a tagged or confirmed interactive object of the one or more interactive objects 20 that is also now a target object of interest for tracking purposes. Such tagging may facilitate monitoring of movement (e.g., motion; movement or motion data) corresponding to the confirmed interactive object of the one or more interactive objects 20. Once tagged, the cameras may continually monitor movement data of the confirmed interactive object of the one or more interactive objects 20 throughout the interactive environment 14. The cameras may send the movement data to the controller 18. The controller 18 may analyze the movement data and may send commands to activate special effects on the confirmed interactive object of the one or more interactive objects 20 and/or implement special effects within the interactive environment 14 based on the movement data for the confirmed interactive object of the one or more interactive objects 20. For example, the movement data associated with the confirmed interactive object of the one or more interactive objects 20 may correspond to a specific motion or gesture (e.g., arm waving; tracing a triangle in space) that causes the controller 18 to transmit a signal that instructs a special effect (e.g., display, haptic, light, sound) from the confirmed interactive object of the one or more interactive objects 20 and/or in the interactive environment 14. The controller 18 may process the movement data and compare the movement data to motion profiles stored in memory to select the special effect (e.g., a lookup table stored in a database in the memory of the controller 18; one gestures such as the arm waving triggers one special effect, other gestures such as tracing the triangle in space triggers another special effect, and so on). Further, because the confirmed interactive object of the one or more interactive objects 20 has been associated with a user profile, certain aspects of the user profile may be used (e.g., to personalize special effects or personalized gesture detection thresholds).

In an embodiment, the interactive object control system 10 may select the best candidate interactive object of the one or more interactive objects 20 via other techniques. For example, the controller 18 may send a signal (e.g., non-specific signal) to the one or more interactive objects 20, and the signal may activate the one or more object emitters 30 of the one or more interactive objects 20 that are within range of the signal. The signal may cause the one or more object emitters 30 of the one or more interactive objects 20 that are within the range of the signal to emit light, sound, or some other detectable emission. Such emissions from the one or more interactive objects 20 can then be detected to confirm location and identity thereof. For example, the one or more object emitters 30 may each illuminate with a unique color and/or a unique pattern. The one or more sensors 16 (e.g., cameras) capture images, the controller 18 may assess the images to identify the unique color and/or the unique pattern, and then the controller 18 may reference a lookup table that links the unique color and/or the unique pattern to a corresponding interactive object of the one or more interactive objects 20 and/or a corresponding user profile. The controller 18 may also tag each individual interactive object of the one or more interactive objects 20 based on detection of the unique colors and/or the unique patterns. At this point, each of these interactive objects of the one or more interactive objects 20 may be considered a tagged or confirmed interactive object of the one or more interactive objects 20 that is also now a target object of interest for tracking purposes. Such tagging may facilitate monitoring of movement (e.g., motion; movement or motion data) corresponding to the confirmed interactive objects of the one or more interactive objects 20. For example, once tagged, the cameras may continually monitor movement data of the confirmed interactive objects of the one or more interactive objects 20 throughout the interactive environment 14.

As generally disclosed herein, the detection of an interactive object of the one or more interactive objects 20 may be controlled by the controller 18, which may also drive the one or more emitters 28. The activation may be indiscriminate, such that the one or more emitters 28 continuously emit electromagnetic radiation of a particular wavelength or frequency that corresponds to the communication circuitry 26 (e.g., to trigger return of the object identification information from the communication circuitry 26). Any interactive object of the one or more interactive objects 20 20 positioned within the interactive environment 14 and within range of the one or more emitters 28 may be activated to emit a signal indicating the object identification information of that interactive object of the one or more interactive objects 20 to the one or more of the sensors 16 (e.g., RFID readers) dispersed throughout the interactive environment 14. Each interactive object of the one or more interactive objects 20 (e.g., each of several different categories or types of interactive objects) may be operable to respond to the same activation signal from the one or more emitters 28 in a unique way, which may facilitate identification. For example, all blue toy sword interactive objects of the one or more interactive objects 20 may be activated by an emitter signal to emit a blue light, while all red toy sword interactive objects of the one or more interactive objects 20 may be activated by the same emitter signal to emit a red light. Such distinctions may facilitate identification by at least narrowing down possibilities and/or providing unique emissions when the users 12 are in smaller groups or groups with defined combinations of interactive objects of the one or more interactive objects 20 (e.g., all groups that pass through the interactive environment 14 are given a blue toy sword, a red toy sword, a yellow toy sword, and a green toy sword).

As noted herein, the one or more interactive objects 20 may include multiple interactive objects. In such cases, when tracking the multiple interactive objects in the interactive environment 14, and particularly wherein two or more of the multiple interactive objects are close together and performing gestures that are intended to trigger special effects as part of an interactive experience, it may be difficult to distinguish between the multiple interactive objects. However, in such cases and during operation, each interactive object of the multiple interactive objects may be activated to present a unique light emission to facilitate distinguishing between the multiple interactive objects. Further, in an embodiment, the activation of the multiple interactive objects may be selective. Specifically, the controller 18 may process the object identification information transmitted from the multiple interactive objects via the respective communication circuitry 26 of the multiple interactive objects. Further, upon receiving the object identification information, the controller 18 may identify a particular interactive object of the multiple interactive objects as the best candidate interactive object of the multiple interactive objects (e.g., based on a signal strength) and then selectively send a signal that is directed to (e.g., only to) the particular interactive object of the multiple interactive objects. Further, upon locating and selecting the particular interactive object of the multiple interactive objects, the controller 18 may drive the one or more emitters 28 to send the signal to the particular interactive object of the multiple interactive objects. The signal may activate components of the particular interactive object of the multiple interactive objects to cause an emission from the one or more object emitters 30 of the particular interactive object of the multiple interactive objects. The emission from the particular interactive object of the multiple interactive objects may be detected to confirm a presence of the particular interactive object of the multiple interactive objects, a position of the particular interactive object of the multiple interactive objects within the interactive environment 14, and so forth. The emission from the particular interactive object of the multiple interactive objects may enable the controller to tag the particular interactive object of the multiple interactive objects, which assists with subsequent motion tracking to isolate motions made by the particular interactive object of the multiple interactive objects even while the particular interactive object of the multiple interactive objects is surrounded by other interactive objects of the multiple interactive objects (of the one or more interactive objects 20). In this way, the controller 18 may determine that the particular interactive object of the multiple interactive objects (of the one or more interactive objects 20) has performed a particular action (e.g., a gesture), despite other interactive objects of the multiple interactive objects (of the one or more interactive objects 20) being in the same vicinity. In an embodiment, the controller 18 may enable or disable special effects on the particular interactive object of the one or more interactive objects 20 and/or in the interactive environment 14 based on the motions of the particular interactive object of the one or more interactive objects 20, as well as based on a particular narrative (e.g., theme) and/or based on the user profile, for example.

Because the one or more interactive objects 20 may provide emissions (e.g., activate onboard LEDs), the one or more interactive objects 20 may include onboard power supplies. For example, some interactive objects of the one or more interactive objects 20 may include a Near-Field Communication (NFC) coil located in the interior of the respective interactive object of the one or more interactive objects 20. The NFC coil may facilitate charging and/or power boosting for the respective interactive object of the one or more interactive objects 20 by gaining charge via transmission of energy from an external device, such as an external devices associated with the user 12 (e.g. mobile phone, NFC charger, which may be implemented as a toy or wearable device). The external device may include a holster and/or holder for the respective interactive object of the one or more interactive objects 20 so that the respective interactive object of the one or more interactive objects 20 may continuously charge as the user 12 moves throughout the interactive environment 14. The respective interactive object of the one or more interactive objects 20 may also include a rechargeable energy vessel/source (e.g. battery, super capacitor, and so forth) that may buffer and store energy, such as energy from the one or more emitters 28 (e.g., RFID reader), an electronic device associated with the user 12 (e.g., user's electronic device), an accessory of the respective interactive object of the one or more interactive objects 20, and so forth. The rechargeable energy source may facilitate provision of effects (e.g., light emissions) even when power from an external power source is not present.

In an embodiment, the one or more interactive objects 20 may be recharged throughout the day if on display and/or not in use by the users 12. The charging methods for the one or more interactive objects 20, may include mid-range to long-range charging methods via charging over Ultra high frequency (UHF) radio frequencies and charging using near-field communication (NFC) methods (e.g., NFC coil located within the one or more interactive objects 20, near field device). It should be understood that any of the above charging methods may be implemented individually or in combination. Further, the discussed power harvesting techniques may be used to directly power on-board special effects of the one or more interactive objects 20 and/or may be used to charge a battery or power storage of the one or more interactive objects 20 that may power the special effects.

As noted above, the one or more interactive objects 20 may include an NFC coil to facilitate powering the one or more interactive objects 20. However, the NFC coil may also enable pairing of a user's interactive object of the one or more interactive objects 20 to the user's electronic device to allow for interactivity between the user's electronic device and the user's interactive object of the one or more interactive objects 20. For example, the user's electronic device (e.g., mobile device of the user 12) may pair with the user's interactive object of the one or more interactive objects 20 (e.g., a toy magic ring) and allow transmission of interactive object performance data (e.g., past effects) to the user's electronic device. The performance data of the user's interactive object of the one or more interactive objects 20 may be processed via an application of the user's electronic device and displayed to the user 12 so that the user 12 can view their performance statistics (e.g., in essentially real time), wherein the performance statistics may include past experiences, statistics associated with a ride experience and/or show, and the like.

Figure 2:
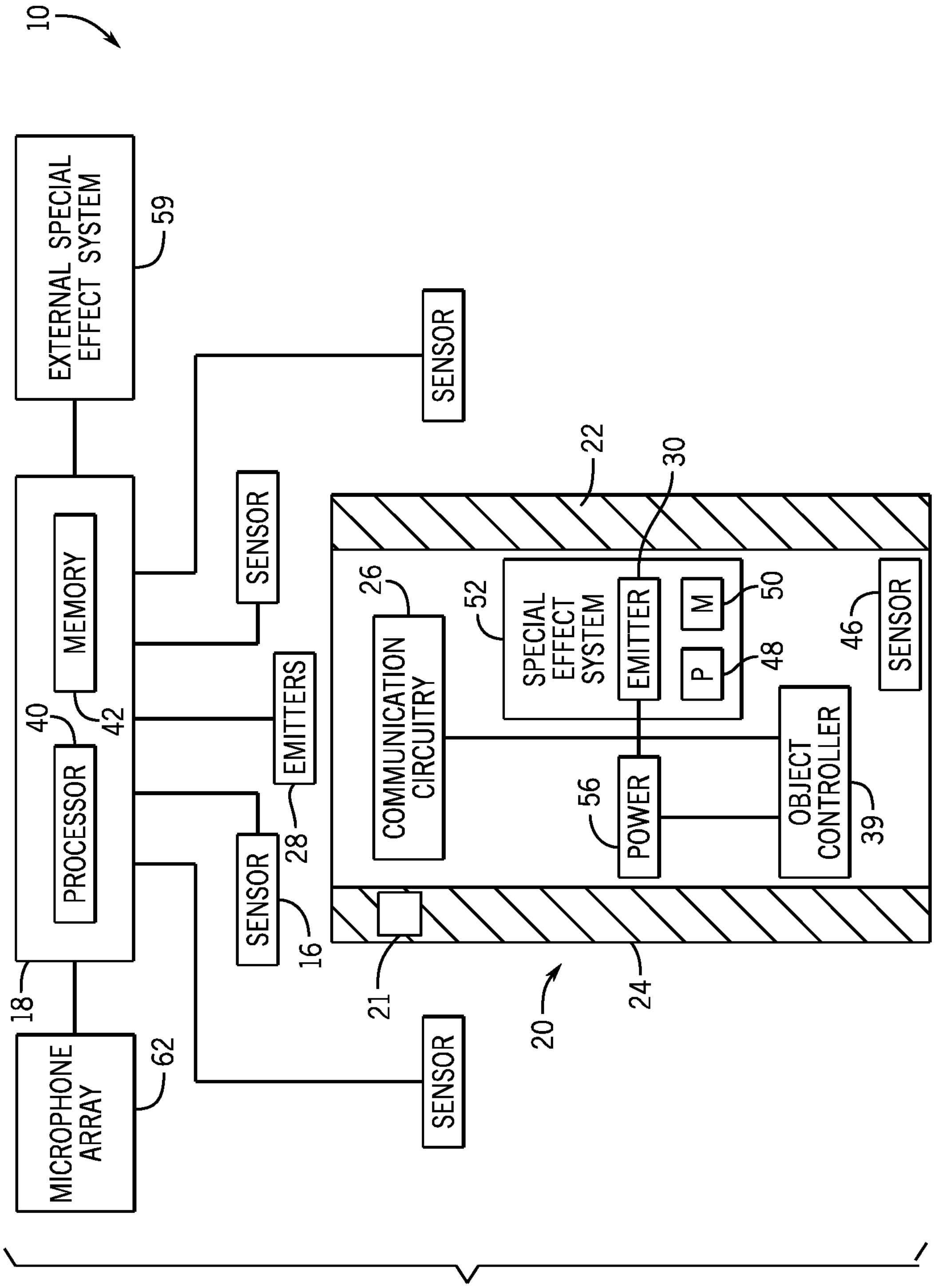
FIG. 2 is a schematic illustration of hardware of an embodiment of the interactive object control system of FIG. 1, in accordance with present techniques.

FIG. 2 is a schematic diagram of the interactive object control system 10 demonstrating communication between the one or more interactive objects 20 and various components of the interactive object control system 10 external to the one or more interactive objects 20. Disclosed techniques for detecting or locating the one or more interactive objects 20 as provided herein may utilize the one or more sensors 16 (e.g., optical sensors, image sensors, and the like) that provide location and/or movement data of the one or more interactive objects 20.

In operation, the one or more sensors 16 may detect the one or more interactive objects 20 based on the detectable marker 21 (e.g., retroreflective marker) on the one or more interactive objects 20 and/or via RF communications with the communication circuitry 26 of the one or more interactive objects 20. As noted herein, additionally or alternatively, other sensing methods may be utilized to detect the presence of the user 12 and/or the one or more interactive objects 20 in the interactive environment 14. The communication circuitry 26, which may include an RFID tag, may transmit electromagnetic radiation that indicates the object identification information to the one or more sensors 16 in the interactive environment 14. Similarly, aspects (e.g., shape, filtered color) of the detectable marker 21 may correlate to object identification information (e.g., via reference to a lookup table).

A processor 40 of the controller 18 may utilize this data to link a specific interactive object of the one or more interactive objects 20 to a specific user 12 in the interactive environment 14. The controller 18 may send a targeted signal or instruction (e.g., a personalized special effect signal) to the communication circuitry 26 of the specific interactive object of the one or more interactive objects 20 based on the linkage of the user 12 to the specific interactive object of the one or more interactive objects 20. Moreover, the controller 18 may update the user profile based on the user's interactions within the interactive environment 14. This targeted instruction or signal sent by the controller 18 may be processed by an object controller 39 housed in the specific interactive object of the one or more interactive objects 20. The object controller 39 may activate the special effect system 52, which is powered either passively (e.g., via power harvesting) or actively (e.g., by a power source) to emit a special effect that is personalized to the user's profile and/or to the specific interactive object of the one or more interactive objects 20. Such a unique activation of the special effect from the specific interactive object of the one or more interactive objects 20 may facilitate confirmation of the identity of the user and/or the specific interactive object of the one or more interactive objects 20 because it may be the only interactive object of the one or more interactive objects 20 among a group of interactive objects of the one or more interactive objects 20 providing the special effect. Further, special effects in the interactive environment 14 based on actions (e.g., gestures) performed by the specific interactive object 20 may be specialized based on the linkage to the user 12 (e.g., themed in accordance with a theme preference designated in the user profile).

In the depicted embodiment, the communication circuitry 26 may emit a wireless signal that communicates object identification information via a RFID tag, an infrared light signal, or the like. The one or more sensors 16 may receive the object identification information and transmit the object identification information to the controller 18. The object identification information may then be utilized by the processor 40 of the controller 18. Specifically, for example, the controller 18 may link a user profile to the interactive object of the one or more interactive objects 20 based on the object identification information. When trying to link the interactive object of the one or more interactive objects 20 to a specifically detected action performed (e.g., positioning, location, gesture) by one of a group of interactive objects of the one or more interactive objects 20, the controller 18 may determine that the interactive object of the one or more interactive objects 20 is the best candidate interactive object within the interactive environment 14 based one or more factors, which may include relative received signal strength of multiple received signals. That is, the best candidate interactive object may correspond to a particular interactive object of the one or more interactive objects 20 emitting a signal having a highest received signal strength indicator (RSSI) value, which measures an amount of power present in a signal. Confirming the best candidate interactive object of the one or more interactive objects 20 may also involve reference to a user profile associated with the signal. For example, the user profile may designate an address for an RFID tag of the best candidate interactive object of the one or more interactive objects 20, and the controller 18 may initiate transmission of a responsive signal (e.g., a radio frequency signal) to this address to activate one or more object emitters 30 of the best candidate interactive object of the one or more interactive objects 20. Upon detection of emission from the one or more object emitters 30 by the one or more sensors 16, the interactive object control system 10 may tag the emitting interactive object of the one or more interactive objects 20 to confirm its identity and to facilitate further monitoring of the emitting interactive object of the one or more interactive objects 20 over time, so that unique effects (e.g., associated with the user profile of the emitting interactive object of the one or more interactive objects 20) may be correlated with the emitting interactive object 20 based actions performed thereby.

In an embodiment, once the best candidate interactive object of the one or more interactive objects 20 is selected (but not yet confirmed), the one or more object emitters 30 of other interactive objects of the one or more interactive objects 20 may deactivate, such that the best candidate interactive object of the one or more interactive objects 20 may be more readily confirmed since it should be the only interactive object of the one or more interactive objects 20 emitting light via one or more object emitters 30. In other words, briefly (e.g., milliseconds, less than one second) blocking light emissions from all of the interactive objects of the one or more interactive objects 20 20 in a given area except those from the best candidate interactive object of the one or more interactive objects 20 may enable the best candidate interactive object of the one or more interactive objects 20 to efficiently be tagged and tracked by the interactive object control system 10. This is partly because the interactive object control system 10 will not have to process additional light emitted from other interactive objects of the one or more interactive objects 20 within the interactive environment 14. The respective object emitters 30 of the other non-best candidate interactive objects of the one or more interactive objects 20 may be deactivated once the best candidate interactive object of the one or more interactive objects 20 is identified and a signal is sent to the best candidate interactive object of the one or more interactive objects 20 from the controller 18 to activate one or more object emitters 30. Once the best candidate interactive object is of the one or more interactive objects 20 confirmed through this process, the other object emitters 30 may be reactivated. If the best candidate interactive object of the one or more interactive objects 20 does not emit light as expected or is not detected as emitting the expected light, a new selection process may begin because it could not be confirmed.

In an embodiment, once the best candidate interactive object of the one or more interactive objects 20 is selected (but not yet confirmed), the one or more emitters 28 may be turned off briefly (e.g., milliseconds, less than one second) while the one or more object emitters 30 of the best candidate interactive object of the one or more interactive objects 20 are activated to emit light. Such techniques take advantage of the detectable markers 21, as only the one or more object emitters 30 of the best candidate interactive object of the one or more interactive objects 20 will be illuminated (e.g., on) and the other non-best candidate interactive objects of the one or more interactive objects 20 will not be illuminated (e.g., dark; off) to facilitate confirmation of the best candidate object of the one or more interactive objects 20. Once the best candidate interactive object of the one or more interactive objects 20 is confirmed through this process, the one or more emitters 28 may be reactivated. If the best candidate interactive object does of the one or more interactive objects 20 not emit light as expected or is not detected as emitting the expected light, a new selection process may begin because it could not be confirmed.

A memory 42 of the controller 18 may store user profiles of multiple users 12 who have previously been matched to multiple interactive objects of the one or more interactive objects 20 within the interactive environment 14. The user profiles of an application associated with the interactive environment 14 may be updated based on activity of respective interactive objects of the one or more interactive objects 20 taking place throughout the interactive environment 14. The controller 18 may update a user profile based on the user's experiences with their interactive object of the one or more interactive objects 20 within the area of the interactive environment 14. This may enable special effects to be differentiated based on the user profile throughout the interactive environment 14, and within multiple visits to the interactive environment 14. The user profile may also include information that is associated with the user 12, which may include user specific characteristics that are determined before first use of interactive object of the one or more interactive objects 20 and after first use of the interactive object of the one or more interactive objects 20. These characteristics may enable further differentiation of special effect commands based on the specific user 12. For example, if a user 12 requests a specific affiliation to a group or selects a specific category from a preset selection of categories, the user profile may be updated to display this information. The controller 18 may send a special effect signal based on the user profile. This may include the output of a specific color LED, a sound effect, a haptic effect, a visual projection, or any combination thereof.

In an embodiment, the controller 18 may send a haptic effect command to at least one interactive object of the one or more interactive objects 20, where the haptic effect command causes a haptic effect in the at least one interactive object of the one or more interactive objects 20 (e.g., via one or more haptic devices). By way of example, the haptic effect may create an experience of touch by applying vibration or other motion to the at least one interactive object of the one or more interactive objects 20. By creating a sense of touch or stimulating the touch sense, the user 12 may become more immersed into the interactive environment 14 since the stimulation may provide a more realistic experience. In an embodiment, the haptic effect command may also provide a particular intensity for the haptic effect, which may be adjusted for each of the at least one interactive object of the one or more interactive objects 20, for example, based on a height 25 of each of the at least one interactive object of the one or more interactive objects 20 with respect to a floor of the interactive environment 14. This may facilitate providing effects designated as appropriate for children or adults based on an approximation associated with height. The one or more interactive objects 20 may include one or more on-board position sensors that may include inductive position sensors, digital height measuring sensors, inertial measurement unit sensors, or any other suitable position sensor that detects and outputs respective signals indicative of the height above the ground 25 of the one or more interactive objects 20. Then, the controller 18 and/or the object controller 39 may, based on the height above the ground 25 of a particular interactive object of the one or more interactive objects 20 (which may approximate an age of the user), instruct the one or more haptic devices of the particular interactive object of the one or more interactive objects 20 to emit a certain intensity of haptic effect. In an embodiment, the haptic effect intensity of the particular interactive object of the one or more interactive objects may increase respectively as the respective height above the ground 25 of the particular interactive object of the one or more interactive objects 20 increases, having a positive correlation between the height above the ground 25 of the particular interactive object of the one or more interactive objects 20 and the haptic effect intensity. For example, a respective height above the ground between approximately 30 inches (76.2 cm) and 50 inches (127 cm) may result in a first haptic effect of less intensity than a respective height above the ground between 55 inches (139.7 cm) and 100 inches (254 cm). In some embodiments, individual users 12 may select the intensity of haptic effects in a user profile (e.g., via inputs to an application on the user's electronic device that provides access to the user profile). For example, the user 12 may indicate or select a preferred haptic intensity regardless of detected height above the ground 25 of their interactive object of the one or more interactive objects 20. Each user's interactive object of the one or more interactive objects 20 may enable the user 12 to provide inputs (e.g., via one or more input devices on each respective interactive object of the one or more interactive objects 20) to select the intensity of haptic effects for the interactive environment 14.

In one example, a particular detected motion pattern of a particular interactive object of the one or more interactive objects 20 (based on object identification information from the one or more sensors 16) may be received via the one or more sensors 16 and assessed by the controller 18. Certain types of motion patterns may be associated with activating different colors, such as one motion pattern that activates a red object emitter 30 on the particular interactive object of the one or more interactive objects 20 and another motion patter that activates a blue object emitter 30 on the particular interactive object of the one or more interactive objects 20. Based on a detected motion pattern, the instructions for activation of the light color of the one or more object emitters 30 are transmitted to the particular interactive object of the one or more interactive objects 20. The special effect instructions may include instructions to set an intensity, hue, or interval pattern of light activation. One or more of these may be varied based on characteristics of the sensed motion pattern and/or user profile characteristics. In an embodiment, the activation of the on-board special effect provides feedback to the user 12 that a successful interactive experience has occurred (e.g., the user 12 properly performed a particular motion pattern), and lack of the special effect or a muted special effect (e.g., relatively dim light activation; a particular color, such as red or yellow) is indicative that the interaction should be improved or altered (e.g., the user 12 did not properly perform the particular motion pattern).

In an embodiment, characteristics of light emitted by the one or more object emitters 30 of a particular interactive object of the one or more interactive objects 20 is based on environmental conditions (e.g., cloud coverage, time of day, light exposure) of the interactive environment 14. The controller 18 may receive environmental condition data via the one or more sensors 16, which may include photoelectric sensors that track light intensity throughout the day, for example. The controller 18 may send commands to the particular interactive object of the one or more interactive objects 20 based on the light intensity. For example, if it is dark (e.g., dusk time; lighting effects in the interactive environment 14 are dimmed or turned off) and the light intensity of the interactive environment 14 is measured to be below a threshold light value, the command to light up the one or more object emitters 30 of the particular interactive object of the one or more interactive objects 20 may include instructions to increase a brightness to illuminate at a first, higher brightness. However, if it is bright (e.g., early afternoon; lighting effects in the interactive environment are bright or turned on) and the light intensity of the interactive environment 14 is measured to be above the threshold light value, the command to light up the one or more object emitters 30 of the interactive object 20 may include instructions to decrease the brightness to illuminate at a second, lower brightness. The brightness may be adjusted between a highest brightness and a lowest brightness based on a sliding scale with the light intensity in the interactive environment 14 or according to some other algorithm that changes the brightness to account for the light intensity in the interactive environment 14. In some cases, a default or baseline brightness may be applied while the light intensity is within a normal range of light intensity, but then the brightness may be adjusted when the light intensity is outside of the normal range of light intensity (e.g., increased when the light intensity is below the normal range of light intensity and decreased when the light intensity is above the normal range of light intensity). Adjusting the light based on the environmental conditions, for example, rather than providing a constant light intensity, may aid in visibility and/or support power saving for the interactive object 20. For example, the light output may be adjusted based on the environmental conditions, and the brightness/intensity of the light output may be decreased to provide power saving when it is detected that the environmental conditions provide good visibility for the users to visualize the light emitted by the one or more object emitters 30 even at the lower brightness/intensity.

The controller 18 that drives the one or more emitters 28 and that receives and processes data from the one or more sensors 16 may include the one or more processors 40 and the memory 42. The processors 40, 48 and the memories 42, 50 may be generally referred to as "processing circuitry" herein. By way of a specific but non-limiting example, the one or more processors 40, 48 may include one or more application specific integrated circuits (ASICs), one or more field programmable gate arrays (FPGAs), one or more general purpose processors, or any combination thereof. Additionally, the one or more memories 42, 50 may include volatile memory, such as random access memory (RAM), and/or non-volatile memory, such as read-only memory (ROM), optical drives, hard disc drives, or solid-state drives. In some embodiments, the controller 18 may form at least a portion of a control system to coordinate operations of various amusement park features, such as an amusement park attraction and the interactive object control system 10. It should be understood that the subsystems of the interactive object control system 10 may also include similar features. In one example, the special effect system 52 may include processing capability via the processor 48 and the memory 50. Further, the object controller 39, may also include integral processing and memory components. Alternatively, the controller 18 may control components of the interactive object 20.

The controller 18 may be part of a distributed decentralized network of one or more controllers 18. The decentralized network of the one or more controllers 18 may communicate with a park central controller and park central server. The decentralized network of the one or more controllers 18 may facilitate reduction in processing time and processing power required for the one or more controllers 18 dispersed throughout one or more interactive environments 14. The decentralized network of the one or more controllers 18 may be configured to obtain user profiles by requesting the user profiles from a profile feed stored in the park central server. The user profile feed may include user accomplishments associated with the interactive object, user experience level, past user locations, and other user information. The one or more controllers 18 may act as edge controllers that subscribe to a profile feed including multiple user profiles stored in a park central server and cache the feed to receive one or more user profiles contained in the feed.

In some embodiments, the interactive environment 14 may include one or more controllers 18. The one or more controllers 18 within the interactive environment 14 may communicate with each other through the use of a wireless mesh network (WMN) or other wireless and/or wired communication methods. The special effect commands may be generated by the controller 18, a distributed node of the controller 18, or by a dedicated local controller associated with the interactive environment 14 and communicated to the one or more interactive objects 20.

In another embodiment the interactive object control system 10 may include a microphone array 62 that may detect one or more sounds output by the interactive objects 20 within the interactive environment 14. Each of the one or more interactive objects 20, via the object controller 39, may detect when certain movements are performed and emit a particular sound (e.g., one unique sound per movement or gesture, such as a first sound for tracing a circle in space and a second sound for up and down motions due to jumping). The microphone array 62 may detect the particular sound and send the sound data associated with each of the one or more interactive objects 20 to the controller 18. The controller 18 may then direct one or more special effect signals to each of the one or more interactive objects 20 and/or to components in the interactive environment 14 based on the sound detection (e.g., a first animated character is displayed for a first motion, which may be indicated by the first sound; a second animated character is displayed for a second motion, which may be indicated by the second sound).

At least one interactive object of the one or more interactive objects 20 may include a power source 56, which may be a battery or a power-harvester, such as a radio frequency based power-harvesting antenna or an optical harvester. The power source 58, such as the harvested power, is used to power one or more functions of the at least one interactive object of the one or more interactive objects 20, such as the special effect system 52. For example, the power source 56 may power multiple light emitting diodes with red, green, blue and white (RGBW) emitters.

Figure 3:
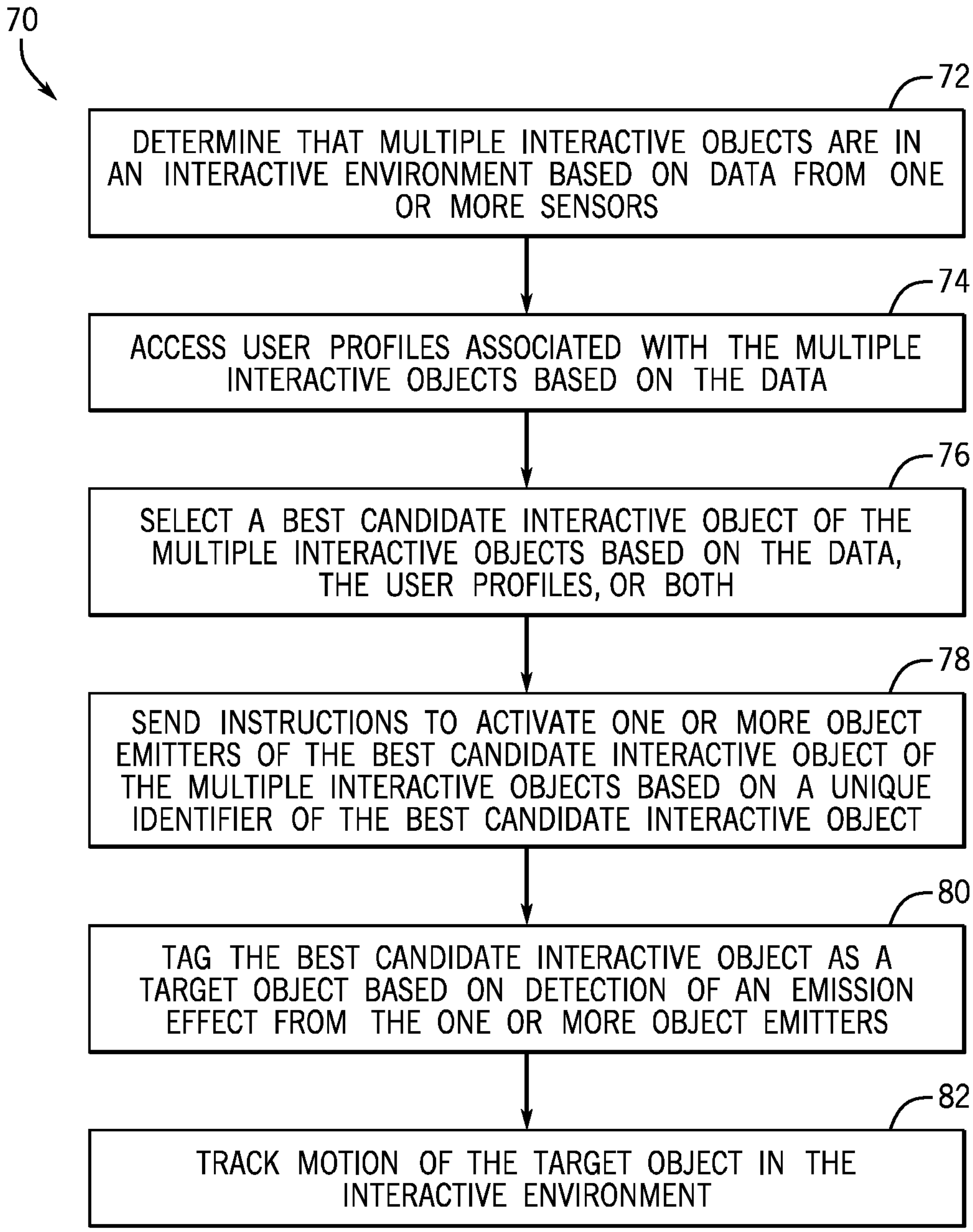
FIG. 3 is a flow diagram of a method for detecting an interactive object, in accordance with present techniques.

FIG. 3 is a flow diagram of an embodiment of a method 70 for detecting one interactive object of the one or more interactive objects 20 and activating that one interactive object of the one or more interactive objects 20, in accordance with present techniques. Generally, the method 70 includes a process for detecting that one or more interactive objects 20 are within the interactive environment 14, identifying or tagging at least one of the one or more interactive objects 20, and tracking the respective movement or actions of the at least one of the one or more interactive objects 20. Identification of the one or more interactive objects 20 is facilitated through use of one or more sensors 16 (e.g., IR sensors, visible light sensors, radio frequency sensors) dispersed throughout the interactive environment 14.

The method 70 includes the controller 18, at block 72, determining that one or more interactive objects 20 are within the interactive environment 14 based on data received from the one or more sensors 16. The interactive environment 14 may include one or more emitters 28 that emit electromagnetic radiation and/or visible/ultraviolent light into the interactive environment 14. In embodiments using the communication circuitry 26 of at least one interactive object of the one or more interactive objects 20, the communication circuitry 26 may be triggered by the electromagnetic radiation, causing the communication circuitry 26 to emit a wireless signal that provides object identification information data to the one or more sensors 16. In embodiments using the detectable marker 21, the detectable marker 21 reflects the visible/ultraviolet light emitted from the one or more emitters 28 for detection by the one or more sensors 16 within the interactive environment 14. The detectable marker 21 may include characteristics (e.g., color filtering, shape) that can be detected in the retroreflected light and associated with profile information, including object identification data.

The controller 18, at block 74, accesses user profiles associated with the one or more interactive objects 20 based on the data (e.g., indicative of the unique identifier from the RFID tag, the retroreflector characteristics, the object identification data) received from the one or more sensors 16. The controller 18 may query a database stored in a memory to determine a respective user profile and/or information for each of the one or more interactive objects 20 based on the data. The respective user profile may include user past experiences, user preferences, user information, and the like.

With respect to identifying a particular interactive object of the one or more interactive objects 20 that is performing an action (e.g., located in a specific position, performing a gesture), the controller 18, at block 76, selects a best candidate interactive object of the one or more interactive objects 20 based on the data (e.g., (e.g., indicative of the unique identifier from the RFID tag, the retroreflector characteristics, the object identification data, and a signal strength provided via the communication circuitry 26) and/or based on the respective user profile associated with the each of the one or more interactive objects 20. The best candidate interactive object may be selected based on the signal strength (e.g., indicative of estimated proximity to the one or more sensors 16 and/or the one or more emitters 28), the user profiles, and the like. For example, two interactive objects of the one or more interactive objects 20 may be within a range of a sensor 16 (e.g., RFID reader), but one of the two interactive objects of the one or more interactive objects 20 may be closer in proximity to the sensor 16. The controller 18 may determine based on emission detector data that the closer of the two interactive objects of the one or more interactive objects 20 is the best candidate interactive object. As another example, two interactive objects of the one or more interactive objects 20 may be within range of the sensor 16, but one of the two interactive objects of the one or more interactive objects 20 may be associated with a child user and the other of the two interactive objects of the one or more interactive objects 20 may be associated with an adult user. The controller 18 may reference image data to determine that the action was performed at a height that is relatively close to the ground and with a relatively small range of motion (e.g., performed over a relatively small volume in space). The controller 18 may also reference the user profiles to select the one of the two interactive objects of the one or more interactive objects 20 that is associated with the child user as the best candidate interactive object of the one or more interactive objects 20.

The controller 18, at block 78, sends instructions to activate one or more object emitters 30 of the best candidate interactive object of the one or more interactive objects 20 based on a unique identifier of the best candidate interactive object of the one or more interactive objects 20 (e.g., the unique identifier obtained via communication with the communication circuitry 26). The one or more object emitters of some of the one or more interactive objects 20 may be one or more LEDs of each respective interactive object of the one or more interactive objects 20, an audio element of each respective interactive object of the one or more interactive objects 20, or any other hardware that may provide an emission effect. The instructions for activating the one or more object emitters 30 may be provided via a radio frequency signal addressed to activate a particular RFID tag of the best candidate interactive object of the one or more interactive objects 20. However, other activation mechanisms may be utilized in accordance with present embodiments.

The controller 18 at block 80, may tag or confirm the best candidate interactive object of the one or more interactive objects 20 as a target object to monitor based on receipt of data (e.g., from the one or more sensors 16) indicating detection of the emission effect from the one or more object emitters 30 of the best candidate interactive object of the one or more interactive objects 20. For example, the activated one or more object emitters 30 may be one or more LEDs of the best candidate interactive object of the one or more interactive objects 20. A visible light camera sensor 16 may detect the light from the LEDs and associate the light with the best candidate interactive object of the one or more interactive objects 20 within the interactive environment 14. In this way, the best candidate interactive object of the one or more interactive objects 20 can be confirmed and then designated or tagged for tracking with confidence that the tracked object has been properly identified. For example, the best candidate interactive object of the one or more interactive objects 20 that has been tagged in this way can be more easily followed through space in the image data obtained over time for the interactive environment 14, with relatively high confidence due to the techniques set forth herein.

The controller 18, at block 82, may track (e.g., via the one or more sensors 16) the motion of the target object within the interactive environment 14, and then may transmit the motion data to the controller 18. The controller 18 may send additional signals to the tracked interactive object of the one or more interactive objects 20 and/or components in the interactive environment 14 based on the motion data. For example, the controller 18 may trigger light, sound, haptic effects, and/or other effects (e.g., display of imagery, such as animated characters) based on the motion data, the user profile, and so forth.

It should be appreciated that the techniques to identify the best candidate interactive object of the one or more interactive objects 20 may be triggered by detection of performance of a gesture (e.g., in response to receipt of signals from the one or more sensors that indicate performance of the gesture, such as a waving movement through space) by at least one of the one or more interactive objects 20. Thus, if one of the users 12 moves their interactive object of the one or more interactive objects 20 to perform the gesture (any of a suite of recognized gestures), the interactive object control system 10 may then retrieve and/or analyze identification information, signal strength information, and so forth to carry out blocks 72-82 of the method 70, for example.

Figure 4:
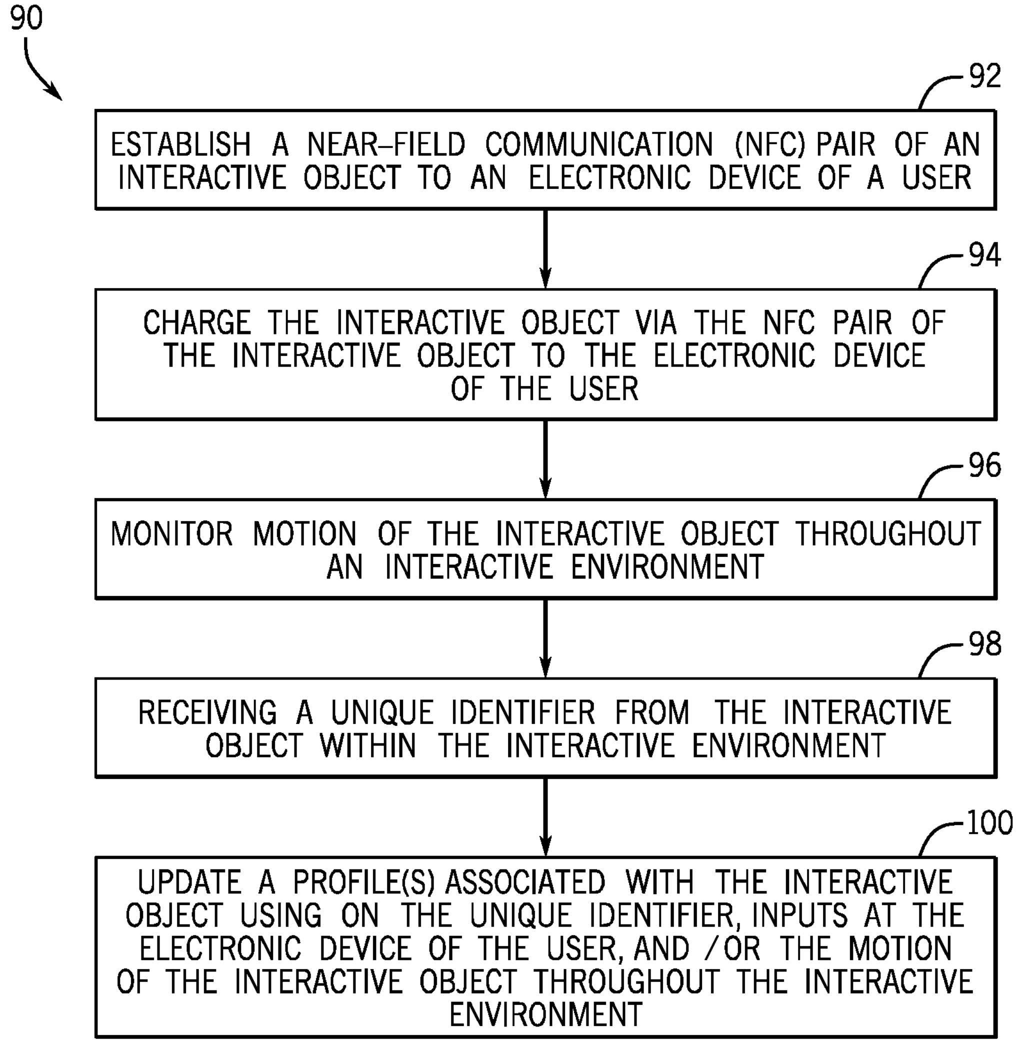
FIG. 4 is a flow diagram of a method for linking a user to an interactive object, in accordance with present techniques.

FIG. 4 is a flow diagram of an embodiment of a method 90 of linking a user 12 to a particular interactive object of the one or more interactive objects 20, in accordance with present techniques. The particular interactive object of the one or more interactive objects 20 may be linked to an electronic device of the user 12 and/or a user profile of the user 12, and special effects may be personalized based on the user's interactions with the particular interactive object of the one or more interactive objects 20.

The method 90 includes the controller 18, at block 92, establishing a near-field communication (NFC) pair with the particular interactive object of the one or more interactive objects 20 and the electronic device associated with the user 12. The controller 18, at block 94, may enable charging the particular interactive object of the one or more interactive objects 20 (e.g., power for operations and/or charging a battery) using the electronic device based on the NFC pair. An NFC coil may enable pairing the particular interactive object of the one or more interactive objects 20 to the electronic device of the user to allow for interactivity between the electronic device of the user and the particular interactive object of the one or more interactive objects 20. For example, the electronic device may pair with the particular interactive object of the one or more interactive objects 20 and allow transmission of interactive object performance data to the electronic device. The particular interactive object of the one or more interactive objects 20 performance data may be processed via an application of the electronic device for display of performance statistics in real time to the user 12.

The controller 18, at block 96, may monitor motion of the particular interactive object of the one or more interactive objects 20 throughout the interactive environment 14 during the NFC pairing of the electronic device of the user and the particular interactive object of the one or more interactive objects 20. Thus, the particular interactive object of the one or more interactive objects 20 may communicate information to the electronic device, such as special effects and/or the motion of the particular interactive object of the one or more interactive objects 20. The method 90, at block 98, includes receiving, via the controller 18, a unique identifier from the particular interactive object of the one or more interactive objects 20 and/or other information that enables the controller 18 to access object identification information for the particular interactive object of the one or more interactive objects 20. The controller 18 may access the profile of the particular interactive object of the one or more interactive objects 20 and/or the user profile using the unique identifier and/or the other information.

The controller 18, at block 100, may update a profile(s) (e.g., the interactive object profile and/or the user profile) associated with the particular interactive object of the one or more interactive objects 20 based on the unique identifier and/or the other information, inputs received at the electronic device of the user (e.g., user selection of preferences), and/or the motion of the particular interactive object of the one or more interactive objects 20 throughout the interactive environment 14 (e.g., to mark achievements). As noted herein, the controller 18 may communicate with the electronic device of the user, and in this way the updates may be reflected via the application of the electronic device for display of the performance statistics in real time to the user 12. In an embodiment, the interactive object control system 10 may utilize edge computing to collect object identification information via radio frequency communication with the one or more interactive objects 20. The controller 18 may pull associated user profiles from a user profile database and may send instructions to the electronic devices of the users and/or their interactive object of the one or more interactive objects 20 based on the user profiles. In this way, the controller 18 may direct personalized special effects to the one or more interactive objects 20 based on the user profiles.

While certain example include light emissions in IR range to facilitate discussion and illustrate various use cases, it should be appreciated that any suitable range(s) may be utilized to enable techniques disclosed herein (e.g., visible light; IR and/or visible light). For example, any suitable light range(s) may be emitted by the emitters and object emitters, and any suitable range(s) may be detected by the sensors, cameras, and so forth. While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive object control system, comprising:

processing circuitry comprising one or more processors; and memory storing instructions executable by the processing circuitry to cause the processing circuitry to:

determine a respective signal strength of respective signals received at communication circuitry from respective interactive objects of a plurality of interactive objects in an interactive environment;

select a best candidate interactive object from the plurality of interactive objects based on the respective signal strength of the respective signals;

send instructions to the best candidate interactive object to activate one or more object emitters of the best candidate interactive object, wherein the one or more object emitters comprises one or more light emitters configured to emit light, and the instructions to the best candidate interactive object to activate the one or more object emitters of the best candidate interactive object cause the one or more light emitters to emit light;

in response to detection of an emission from the one or more object emitters of the best candidate interactive object, tag the best candidate interactive object as a target interactive object;

track motion of the target interactive object;

provide output instructions to the one or more object emitters, to one or more special effect components in the interactive environment, or both to generate special effect outputs based on the motion of the target interactive object;

in response to no detection of the emission from the one or more object emitters of the best candidate interactive object, select an additional best candidate interactive object from the plurality of interactive objects based on the respective signal strength of the respective signals; and send instructions to the additional best candidate interactive object to activate one or more additional object emitters of the additional best candidate interactive object.

2. The interactive object control system of claim 1, wherein the one or more object emitters comprises one or more speakers configured to emit sounds.

3. The interactive object control system of claim 1, wherein the instructions are executable by the processing circuitry to cause the processing circuitry to provide the output instructions to the one or more object emitters to generate the special effect outputs.

4. The interactive object control system of claim 3, comprising the plurality of interactive objects, wherein the one or more object emitters comprises one or more speakers configured to emit sounds, one or more haptic devices configured to emit haptic effects, or any combination thereof, and the output instructions are configured to activate the one or more object emitters to cause the one or more speakers to emit the sounds, the one or more haptic devices to emit the haptic effects, or any combination thereof.

5. The interactive object control system of claim 1, wherein the instructions are executable by the processing circuitry to cause the processing circuitry to provide the output instructions to the one or more special effect components in the interactive environment to generate the special effect outputs, and the one or more special effect components comprises a display, a light emitter, a speaker, a haptic device, or any combination thereof.

6. The interactive object control system of claim 1, wherein the instructions are executable by the processing circuitry to cause the processing circuitry to access respective user profiles for the respective interactive objects of the plurality of interactive objects in the interactive environment based on the respective signals received at the communication circuitry.

7. The interactive object control system of claim 6, wherein the instructions are executable by the processing circuitry to cause the processing circuitry to select the best candidate interactive object from the plurality of interactive objects based on the respective signal strength of the respective signals and the respective user profiles.

8. A method of operating an interactive object control system, the method comprising:

determining, using one or more processors, a respective signal strength of respective signals received from respective interactive objects of a plurality of interactive objects in an interactive environment;

selecting, using the one or more processors, a best candidate interactive object from the plurality of interactive objects based on the respective signal strength of the respective signals;

sending, using the one or more processors, instructions to the best candidate interactive object to activate one or more object emitters of the best candidate interactive object, wherein the one or more object emitters comprise one or more light emitters configured to emit light, and the instructions to the best candidate interactive object to activate the one or more object emitters of the best candidate interactive object cause the one or more light emitters to emit light;

tagging, using the one or more processors, the best candidate interactive object as a target interactive object in response to receipt of data that indicates detection of an emission from the one or more object emitters of the best candidate interactive object;

tracking, using the one or more processors, motion of the target interactive object;

providing, using the one or more processors, output instructions to the one or more object emitters, to one or more special effect components in the interactive environment, or both to generate special effect outputs based on the motion of the target interactive object;

selecting, using the one or more processors, an additional best candidate interactive object from the plurality of interactive objects based on the respective signal strength of the respective signals in response to receipt of data that indicates no detection of the emission from the one or more object emitters of the best candidate interactive object; and sending, using the one or more processors, instructions to the additional best candidate interactive object to activate one or more additional object emitters of the additional best candidate interactive object.

9. The method of claim 8, wherein generating the special effect outputs based on the motion of the target interactive object comprises sending the output instructions to activate the one or more object emitters to emit light, sounds, haptic effects, or any combination thereof.

10. The method of claim 8, comprising:

accessing, using the one or more processors, respective user profiles for the respective interactive objects of the plurality of interactive objects in the interactive environment; and selecting, using the one or more processors, the best candidate interactive object from the plurality of interactive objects based on the respective signal strength of the respective signals and the respective user profiles.

11. An interactive object control system, comprising:

a first interactive object of a plurality of interactive objects, the first interactive object comprising a first light emitter and a first radiofrequency identification tag circuitry;

a second interactive object of the plurality of interactive objects, the second interactive object comprising a second light emitter and a second radiofrequency identification tag circuitry; and processing circuitry comprising one or more processors and memory storing instructions executable by the processing circuitry to cause the processing circuitry to:

detect a respective presence of the first interactive object in an interactive area based on receipt of a first signal from the first radiofrequency identification tag circuitry;

detect a respective presence of the second interactive object in the interactive area based on receipt of a second signal from the second radiofrequency identification tag circuitry;

determine a first signal strength of the first signal;

determine a second signal strength of the second signal;

designate the first interactive object as a best candidate interactive object in response to the first signal strength being greater than the second signal strength;

send instructions to the first radiofrequency tag circuitry of the first interactive object to activate the first light emitter of the first interactive object in response to designating the first interactive object as the best candidate object;

designate the second interactive object as an additional best candidate interactive object in response to receipt of a sensor signal from one or more sensors, wherein the sensor signal indicates no detection of light emitted by the first light emitter of the first interactive object; and send instructions to the second radiofrequency tag circuitry of the second interactive object to activate the second light emitter of the second interactive object in response to designating the second interactive object as the additional best candidate interactive object.

12. The interactive object control system of claim 11, wherein the instructions are executable by the processing circuitry to cause the processing circuitry to:

tag the best candidate interactive object as a target interactive object in response to receipt of an additional sensor signal from the one or more sensors, wherein the additional sensor signal indicates detection of the light emitted by the first light emitter of the first interactive object; and track motion of the target interactive object to generate special effect outputs based on the motion of the target interactive object.

13. The interactive object control system of claim 1, wherein the respective signals are indicative of respective unique identifiers of the respective interactive objects of the plurality of interactive objects, and the instructions are executable by the processing circuitry to cause the processing circuitry to:

use the respective unique identifier of the best candidate interactive object to direct the instructions to the best candidate interactive object to activate the one or more object emitters of the best candidate interactive object.

14. The interactive object control system of claim 13, wherein the instructions are executable by the processing circuitry to cause the processing circuitry to:

determine a performance of a gesture based on the motion of the target interactive object;

provide output instructions to the one or more object emitters and to the one or more special effect components in the interactive environment to generate the special effect outputs based on the performance of the gesture; and use the respective unique identifier to update a respective user profile based on the performance of the gesture.

15. The interactive object control system of claim 1, wherein the instructions are executable by the processing circuitry to cause the processing circuitry to:

instruct one or more emitters to emit light; and track the motion of the target interactive object using respective light reflection signals generated via reflection of the light by the target interactive object.

16. The interactive object control system of claim 1, wherein the respective signals comprise passively-communicated radiofrequency signals.

17. The interactive object control system of claim 1, wherein the target interactive object comprises a sword, a wand, a token, a medallion, headgear, a figurine, a stuffed animal, a clothing item, a jewelry item, a portable object, or any combination thereof.

* * * * *